July 3, 1923.
H. D. CLARKE
1,460,532
DOUBLE REDUCTION DRIVE FOR MOTOR VEHICLES
Filed March 14, 1919     3 Sheets-Sheet 1
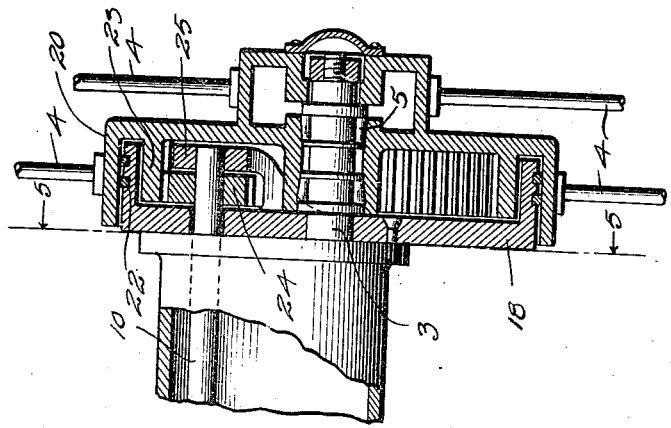
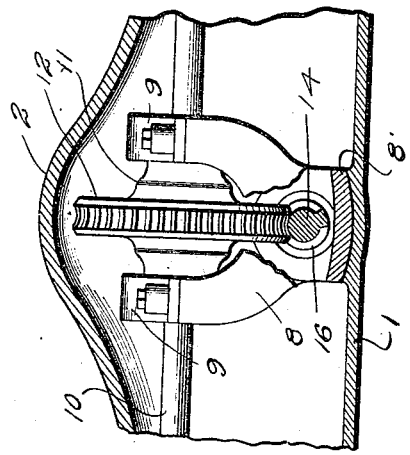
Fig. 1.
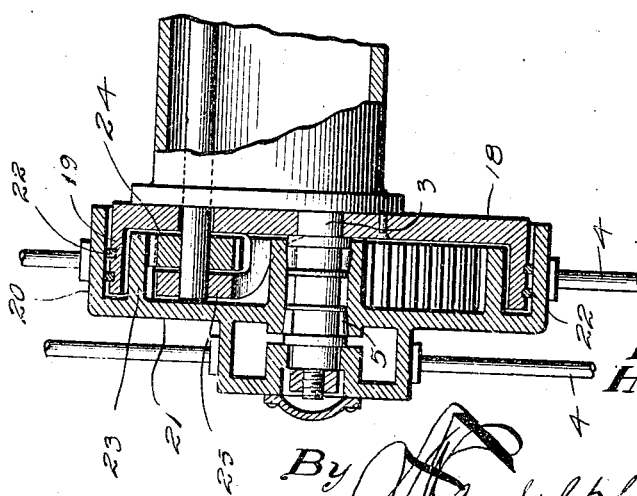
Inventor.
H. D. Clarke
By [signature], Atty.

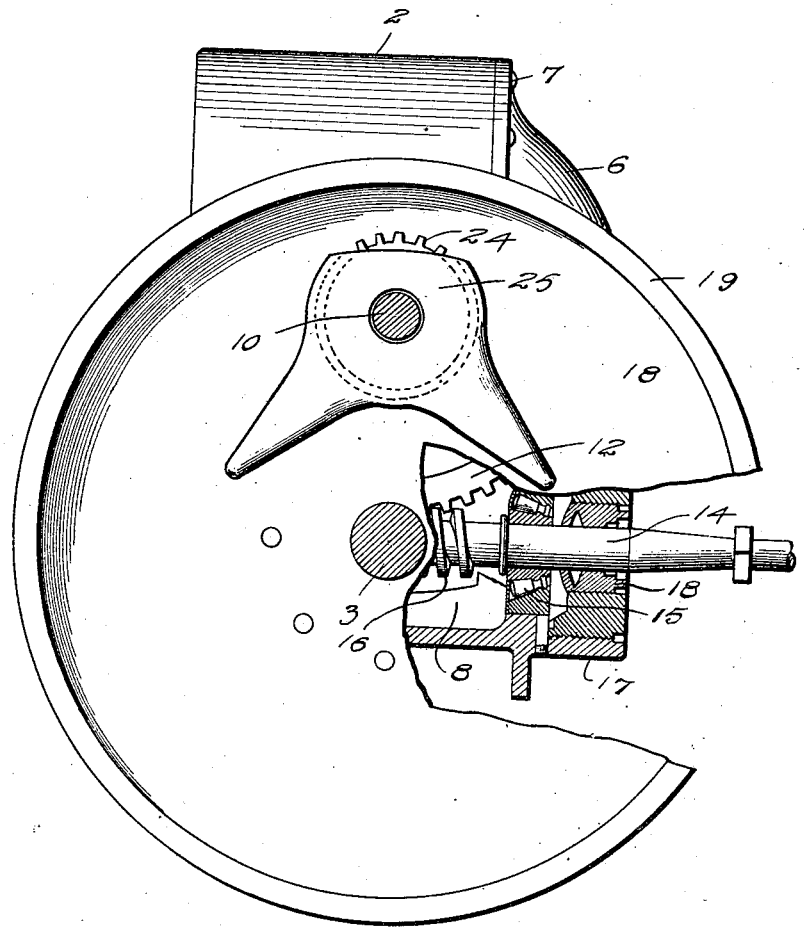

July 3, 1923.
H. D. CLARKE
1,460,532
DOUBLE REDUCTION DRIVE FOR MOTOR VEHICLES
Filed March 14, 1919    3 Sheets-Sheet 3
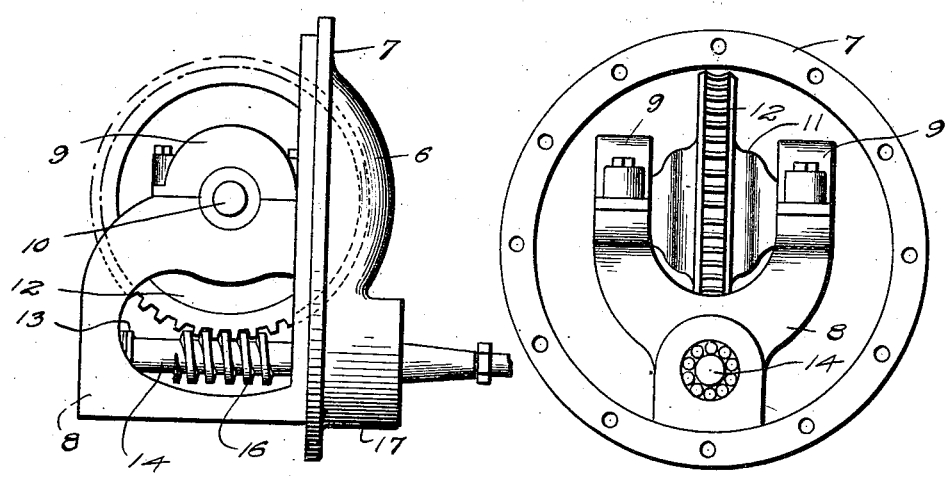
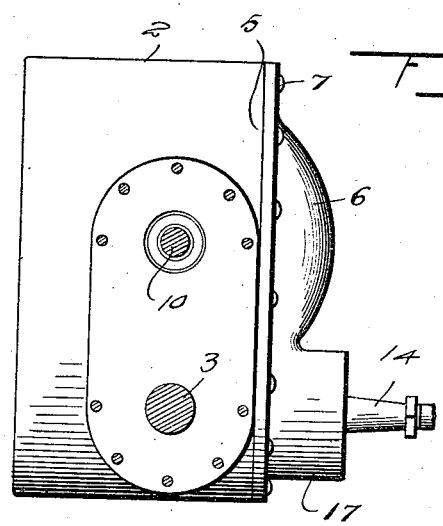
Inventor
H. D. Clarke.

Patented July 3, 1923.

1,460,532

UNITED STATES PATENT OFFICE.

HARRY D. CLARKE, OF PLATTSMOUTH, NEBRASKA, ASSIGNOR TO THE OHIO TRACTOR COMPANY, OF COLUMBUS, OHIO, A CORPORATION OF OHIO.

DOUBLE-REDUCTION DRIVE FOR MOTOR VEHICLES.

Application filed March 14, 1919. Serial No. 282,655.

*To all whom it may concern:*

Be it known that I, HARRY D. CLARKE, a citizen of the United States, residing at Plattsmouth, in the county of Cass and State of Nebraska, have invented certain new and useful Improvements in Double-Reduction Drives for Motor Vehicles; and I do hereby declare the following to be a full, clear, and exact description of the invention, such as will enable others skilled in the art to which it appertains to make and use the same.

This invention relates to new and useful improvements in motor vehicle drives of the worm type and has for one of its objects the provision of means for so mounting the worm in relation to the worm gear and the main axle and the employment of couple gears between the worm gear and the driving wheels of the vehicle, that a double reduction is obtainable with one set of gearing, and also permits of various reductions to be made by the employment of couple gears of different ratios, and further gives a greater clearance between the ground and the housing of the main axle, and further permits the worm to be continuously bathed in lubricant carried in the housing.

Another object of this invention is the provision of means which underslings the worm both to the differential and its drive axles and in horizontal alinement with the load carrying axles, which disposes the bowl of the differential housing uppermost and permits of the power assembly to be placed in a comparatively low plane on the vehicle which gives a low center of gravity to the vehicle thereby reducing the liability of the vehicle overturning and also gives a greater clearance between the ground and the differential housing and further permits power to be delivered in horizontal alinement to the load carrying axles from the power assembly without the employment of universal joints.

A further object of this invention is the provision of a mounting which forms a part of the cover plate and supports the differential and worm drive shaft at the rear of said cover plate, which will assume what forces that may have a tendency to move the cover plate in relation to the housing, thereby permitting the cover plate to maintain its tight engagement with the housing, thus relieving all strain on the fastening elements that secure the cover plate to the housing.

A still further object of this invention is the provision of a double reduction drive for motor vehicles of the above stated character, which shall be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 1 is a vertical sectional view of a double reduction drive for motor vehicles constructed in accordance with my invention, Figure 2 is an end view partly in section illustrating the location of the worm in respect to the worm gear and the main load carrying axle, Figure 3 is a detail side elevation of the hanger or mounting, Figure 4 is a rear elevation of the same, Figure 5 is a sectional view taken on the line 5—5 of Figure 1.

Referring in detail to the drawings, the numeral 1 indicates a main housing having the usual enlarged portion or bowl 2 intermediate its ends and has secured in its ends main or load carrying axles 3 on which are journaled the drive wheels 4. Suitable bearings 5 are placed between the hubs of the wheels 4 and the axles 3 to reduce as much friction as possible and permit free rotation of the wheels on the axles. The enlarged portion or bowl 2 has an opening or entrance way 5 formed in its front wall and which is closed by a plate 6. The plate 6 is secured to the housing 1 by bolts or like fasteners 7. Cast or formed integrally with the plate 6 are spaced hangers 8 having bearings 9 that rotatably support the inner ends of drive axles 10. The hangers 8 are seated within the housing as shown at 8'. Located between the bearings 9 is the ordinary differential casing 11 having the differential therein (not shown) and which is connected to the axle 10 and is connected to a vertically disposed worm gear 12. A bearing 13 is formed in the hangers 8 and receives the rear end of a worm shaft 14 that has its forward end journaled in a bearing 15. The worm shaft is disposed in a plane below and parallel with the worm gear 12 and has formed thereon a worm 16 which meshes with the worm gear 12 and is disposed in a horizontal plane with the main or load carrying axles 3 so that the power source (not shown) connected to the front end of the shaft 14 will deliver its power at a point in a horizontal plane with the axles 3, thereby giving a lower center of gravity to the device which aids in maintaining the vehicle in an upright position on the ground and also gives a greater clearance between the ground and the housing 1. The forward end of the worm shaft 14 extends through an enlarged portion 17 of the cover 16 for connection with the ordinary power source (not shown) and which enlarged portion forms a housing for the bearing 15. The enlarged portion 17 is closed by a leak-proof adjusting collar 18 that retains the bearing 15 in place and prevents grease or lubricant from escaping. The cover 6 is bulged so as to accommodate the worm gear 12 and is machine made along with the hangers 8 and bearings 9 so that when secured to the housing 1 by the bolts 7 a leak-proof connection is established and permits the differential, hanger and worm shaft to all be simultaneously removed through the front of the housing 1 when removing the cover plate and after detaching or removing the axles 10.

As the worm wheel forming a part of the differential and the worm are located at the rear side of the cover plate, and as these parts are journaled in bearings carried by the cover plate, no forces which would tend to disconnect the cover plate from the housing, are exerted upon the cover plate by the worm wheel and worm shaft under any and all load and traction conditions.

The ends of the housing 1 have secured thereto plates 18 or if desired they may be cast thereto. Annular flanges 19 are formed on the plates 18 and are overlaid by the annular flanges 20 formed on the hubs 21 of the wheels 4 and which flanges have interposed between the same packing 22 to establish leak-proof connections. Ring gears 23 are secured to the hubs 21 of the wheels 4 within the flanges 21 and are in mesh with couple gears 24 secured to the outer ends of the drive axles 10 that project through the plates 18 and which have their outer ends supported by bearings 25 formed on the plates 18. The axles 10 with their couple gears 24 are disposed in vertical alinement with the main or load carrying axles 3. By having the flanges 20 overlying the flanges 19 and the packing 22 disposed between the same form leak-proof casings to the ring and couple gears which may be filled or partially filled with lubricant so that all parts will be thoroughly lubricated.

The drive axles 10 which are journaled in the ends of the housing and also in the plates 18 keep the gears 24 in true alinement with the ring gears, thereby preventing uneven gearing of the teeth of the gears. The plates 18 also cooperate with the ends of the housing in forming cups or pockets that partially enclose the gears 24 and bearings of said drive axles and are adapted to catch lubricant as it is brought up by the ring gears, so that said bearings and gears 24 will be thoroughly lubricated. The gears 24 being continuously bathed in lubricant will also furnish lubricant to the teeth of the ring gears where said gears 24 mesh therewith. Therefore, it is to be noted that there is more constant lubrication to the ring gears and gears 24 than that provided by any other internal gear drive.

Any form of wheel may be employed and in this instance I have elected the traction type having the spokes diverging from the rim and having their ends secured to the flange 20 and reduced portion of the hub.

In operation, the power from the power source (not shown) is delivered at dead center of the main or load carrying axle through the medium of the worm and worm gear, so that a low center of gravity is attained and through the worm and worm gear one reduction is obtained to the driving axles 10. A second reduction being obtainable to the driving wheel of the vehicle by the couple gears and by changing the ratio of the couple gears, various reductions are obtainable, thereby providing a driving device for trucks, tractors, and the like which will have an increased pulling and hauling power over similar devices now on the market.

While I have shown and described the preferred embodiment of my invention, it will be understood that minor changes in construction, combination, and arrangement of parts may be made without departing from the spirit and scope of the invention as claimed.

Having thus described my invention, what I claim is:—

1. A differential including a housing, load carrying axles carried by said housing, wheels journaled on said axles, drive axles journaled in said housing and in a plane above and in vertical alinement with said load carrying axles, means connecting the drive axles to the wheels, and a power shaft driving said drive axles and located in a horizontal plane with the load carrying axles.

2. A double reduction drive for motor vehicles including a housing having an opening in the front wall thereof, load carrying axles carried by said housing, wheels journaled on said axles, a cover secured to the housing and closing said opening, an integral hanger carried by said cover, a differential supported by said hanger, drive axles connected to said differential, means connecting the drive axles to the wheels, and a worm power shaft transmitting power to the differential and located in a plane below the same and in a horizontal plane with the load carrying axles and journaled in the hanger, said differential and worm power shaft being located at the rear of the cover plate and carried thereby through the hanger.

In testimony whereof I affix my signature in presence of a witness.

HARRY D. CLARKE.

Witness:
BENNETT I. JONES.